3,088,933
POLYMERS OBTAINED BY POLYCONDENSATION OF POLYHYDRIC ALCOHOLS WITH THE ALKYL ESTERS OF 2,5-DIHYDROXY-HEXAHYDRO-TEREPHTHALIC ACIDS
Gerhard F. Ottmann, Columbus, Ohio, and Christoph J. Grundmann, Lancaster, Pa., assignors to Olin Mathieson Chemical Corporation, a corporation of Virginia
No Drawing. Filed Jan. 13, 1959, Ser. No. 786,465
18 Claims. (Cl. 260—75)

This invention relates to novel polymerization products.

It has been found that new and useful polymers can be obtained by polycondensation of polyfunctional hydroxy compounds with the alkyl esters of 2,5-dihydroxy-hexahydro-terephthalic acid (I)

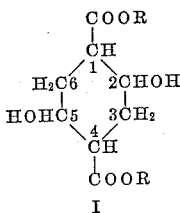

I

In the formula, R is an alkyl group of 1 to 8 carbon atoms. The compounds I have the critical distinctions from terphthalic acid of being fully saturated hydroaromatic compounds, not aromatics, and being tetrafunctional, bearing two different groups of functions, each of different reactivity.

The polymers of this invention possess the general property of remarkable heat resistance. For example, elastomers made from dimethyl-2,5-dihydroxy-hexahydro-terephthalate and ethylene glycol in the presence of p-toluenesulfonic acid as a catalyst can withstand temperatures above 400° C. for long periods of time without losing their elastic properties. This property makes the polymers especially valuable and distinguishes them favorably from the vast majority of known polymers of similar or even quite different structure. The character of the finally obtained polymers varies widely, depending on the catalyst used, the employed polyfunctional hydroxy compound, and also on the ratio between the reaction components, as will be shown in more detail below in a number of examples of the invention. Elastomers to very hard, but not brittle, resins with high mechanical strength can be produced. Opaque and colored materials as well as perfectly transparent polymers can be produced. Also materials can be obtained which possess an exceptionally high adhesiveness to glass, metals, ceramic materials, wood and plastics. Moreover, cross-linked polymers can be produced in situ.

The polymers have particular utility in the manufacture of heat resistant plastic articles. For example, they are useful for the production of plastic articles such as molded articles and castings of sheets, rods, tubes and massive pieces. Due to their remarkable thermal stability they are particlarly advantageous for use at the elevated temperatures used in the processing of thermoplastics, such as in the operations of millings, extrusion and molding, particularly injection molding. The high adhesiveness of the polymers make them particularly suitable for coatings for metals, glass or ceramic materials and particularly for the manufacture of laminated splinter-proof glass. The cross-linked products are particularly useful for in situ polymerization where no further molding is to be done.

The above described properties, especially elasticity, high mechanical strength, excellent adhesive properties combined with an extraordinary thermal stability make the new polymers especially valuable in such fields as supersonic aircraft, guided missiles, and space flight equipment.

The lower alkylesters of the acid can be prepared, for example, as described in copending patent application Serial No. 786,464, filed January 13, 1959, of C. J. Grundmann and G. F. Ottmann, by the reduction of alkylesters of succinylo-succinic acid with hydrogen under elevated temperature and pressure in the presence of nickel or copper chromite catalysts.

By the term lower alkyl esters of 2,5-dihydroxy-hexahydro-terephthalic acid, it is meant esters of aliphatic alcohols of from 1 to 8 carbon atoms, such as the dimethyl-, the diethyl-, the dipropyl-, the diisopropyl-, the dibutyl-, diamyl-, dihexyl-, diheptyl-, and the dioctyl-esters. The preferred ester is dimethyl-2,5-dihydroxy-hexahydro-terephthalate. This compound is preferred for economic reasons, being economical to prepare from methanol, for its low boiling point allowing an easy removal during the transesterification process, and for the fact that, contrary to higher alkyl esters, the compound is a crystalline solid, easy to handle and purify. It is to be understood that the lower alkylesters of 2,5-dihydroxy-hexahydro-terephthalic acid, prepared according to copending application Serial No. 786,464 are always mixtures of at least two stereo-isomers. It is, however, not necessary to employ a sterically uniform material to obtain useful polymers.

The polyfunctional hydroxy compounds useful in this invention include dihydric to hexahydric aliphatic alcohols.

The glycols are particularly useful and ethylene glycol in particular. The polymethylene glycols $HO(CH_2)_nOH$ where $n$ is 2 to 10 and particularly 2 to 4 are particularly useful, e.g. ethylene glycol, trimethylene glycol (propanediol-1,3), tetramethylene glycol (butanediol-1,4), pentamethylene glycol, hexamethylene glycol (hexanediol-1,6), heptamethylene glycol, octamethylene glycol, nonamethylene glycol and decamethylene glycol. The other glycols such as propylene glycol (propanediol-1,2), the butylene glycols (butanediol-1,2 and 1,3) and neopentyl glycol are also useful. Also, the glycols wherein the carbon chain is interrupted by an oxygen, sulfur or nitrogen atoms are also useful, e.g., diethylene glycol, triethylene glycol, B,B'-dihydroxy-diethyl-sulfide and diethanolamine.

The trihydric alcohols include particularly 1,2,5-hexanetriol and glycerol as well as trihydric alcohols in which the carbon chain is interrupted by a nitrogen atom such as triethanolamine.

The tetra to hexahydric alcohols include tetritols such as erythritol and pentaerythritol; pentitols such as ribitol; hexitols such as sorbitol, mannitol, dulcitol; and also the inositols.

The polyhydroxy compounds described above can be represented by the formula

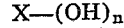

wherein $n$ is an integer of 2 to 6 and X is alkylene, alkyl, or an alkyl chain interrupted by oxygen, sulfur or nitrogen.

The reaction between the lower alkyl esters of 2,5-dihydroxy-hexahydro-terephthalic acid and the employed polyfunctional hydroxy compounds proceeds without catalysts, by application of heat alone. It is, however, preferred to accelerate the rate of reaction by a suitable catalyst. The role of this catalyst is not only to promote the transesterification process but since it will remain in the final product its chemical nature will also influence the properties of the product. The catalyst is also instrumental in the second step of the polymerization, the curing process or cross-linking, which will be described below in detail. Suitable catalysts include the alkali metal alkoxides, such as sodium methylate or potassium tertiary butylate, the oxides of the metals of the group II of the periodic systems of the elements, such as magnesium, calcium, barium or zinc. Further useful catalysts are halides of weak bases like ammonium chloride, aluminum chloride, zinc chloride. The preferred type of catalysts, however, are strongly acidic, including the strong mineral acids, like sulfuric acid, or its acid salts like potassium bisulfate, phosphoric acid, the hydrogen halides, as hydrogen chlorides and hydrogen bromide. Useful catalysts are furthermore organic derivatives of the polyfunctional inorganic acids, like methane-sulfonic acid, benzenesulfonic acid, p-toluenesulfonic acid, the naphthalene-disulfonic acids, phenylphosphonic acids, and p-tolyl boronic acid. Strong organic carboxylic acids, like trifluoroacetic acid, chloroacetic acid, and trichloroacetic acid can also be used as catalysts. Generally, about 0.01 to 5 weight percent of catalyst based on the ester can be used, depending on the particular catalyst.

Although the structural formula of the polymers of the invention has not been definitely established, the equations below present the probable reaction scheme for the formation of the polymers, for example, from a lower alkyl-ester of 2,5-dihydroxy-hexahydro-terephthalic acid and a difunctional alcohol. It is, however, obvious that the principle of the scheme will likewise apply to other polyfunctional hydroxy compounds. In the equations R is alkyl of 1 to 8 carbon atoms, X is alkyl, aryl or cycloalkyl and S indicates that the ring is saturated.

(1) Transesterification

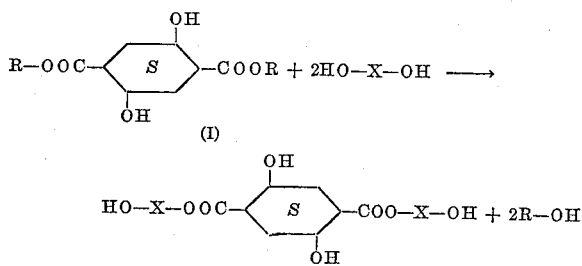

(2) Formation of chain type polyesters

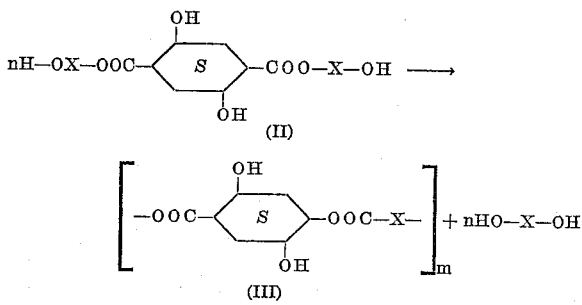

(3) Cross-linking of the chain type polyesters by ether bridges

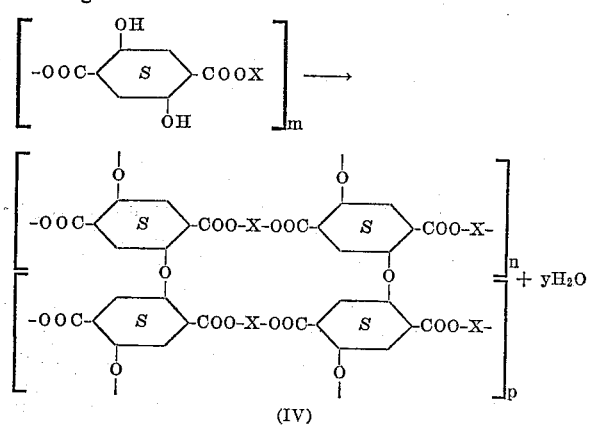

The polymerization reaction between the lower alkyl ester of the 2,5-dihydroxy-hexahydro-terephthalic acid and polyfunctional alcohol occurs in three distinctive phases as illustrated above, i.e., first the transesterification between the ester I and the polyfunctional alcohol to form the intermediate bis-ester II and alcohol, second the polycondensation of the bis-ester intermediate II with itself to form polyester chains III and the polyfunctional alcohol, and third the cross-linking of the chain type polyesters III by ether bridges by the elimination of water to form cross-linked polymers IV. Preferably, the heating for these reactions is carried out at atmospheric or sub-atmospheric pressures and in an inert atmosphere.

The first reaction is the transesterification occurring between the ester and glycol. Stoichiometric proportions are generally used but preferably an excess of the glycol is used, for example up to about 200 mole percent excess based on the ester. The preferred temperature for this step is high enough to allow the alcohol ROH, set free during the reaction to be distilled off, if necessary by means of a distillation column. By this way the equilibrium will be constantly shifted towards the formation of the desired intermediate II, the monomeric bis-ester of the polyfunctional alcohol with the 2,5-dihydroxy-hexahydro-terephthalic acid. The necessary reaction temperature for this reaction will depend on the employed polyfunctional hydroxy compound and catalyst. It generally lies between 60 to 180° C. In the case of the higher boiling alcohols, ROH, vacuum can be applied in order to distill them off within the above temperature range.

The second reaction step, which in fact starts already as soon as some of the intermediate II has been formed, requires in general for a reasonable rate a somewhat higher reaction temperature. This step consists in the formation of long chains of polyester molecules by polycondensation of the intermediate II with itself, thereby splitting off one molecule-equivalent of the employed polyfunctional hydroxy compound. In general this reaction occurs at a reasonable rate within a temperature of 150 to 220° C., depending on the employed polyfunctional alcohol and catalyst. The progress of the polymerization is indicated and can be measured by the change of viscosity of the reaction mixture which increases considerably as the reaction proceeds. Any desired degree of polymerization of this poly-ester-intermediates III can be attained by proper control of temperature and reaction time. The polyfunctional hydroxy compound set free during the polycondensation of the intermediate II can be removed by vacuum distillation if sufficiently volatile within the temperature range of the reaction. In other cases the obtained polyester intermediate III can be purified by conventional techniques, for example, extraction with a selective solvent or precipitation from a mixture of suitable solvents, and thus the unreacted or newly generated polyfunctional hydroxy compound be removed. In some cases, however, it is desirable to purify not the intermediate III, but only the final polymerisate described below. The obtained polyester intermediates III are, in general, at room temperature, very viscous liquids or soft, sometimes sticky resins, but at temperatures between 100° C. and their upper limit of thermal stability, they have a sufficient low viscosity to be handled by the usual molding and injection techniques.

The third and final step of the formation of the polymers consists of a cross-linking of the above described chain type polyester intermediates III by the elimination of water between two hydroxyl groups, belonging to two different chains with formation of an ether bridge. This reaction occurs for each given intermediate within a characteristic narrow temperature range, at a considerable speed and changes the viscous liquid intermediate III within a matter of minutes or seconds into the final solid cross-linked polymer. The temperature at which this reaction occurs depends, as the previously described ones, also on the employed functional hydroxy compound and catalyst. In general it lies between 180 and 250° C. The obtained final polymers of type IV can be purified, if desired, by conventional techniques; for instance, being insoluble in all common solvents, by extraction with suitable solvents in order to remove unreacted starting materials and not fully polymerized intermediates. In some cases such a purification will improve the desirable characteristics of the obtained individual polymer, however, in many cases the usually very small quantities of these impurities are not objectionable for the final use of the polymers.

It is a special advantage of the invention that the formation of the final polymers can be carried out stepwise as described above. By this technique it is possible to employ the polyester chain intermediate III, which can be handled by the known molding and injection techniques, to shape the desired product and cure it in situ by simple thermal treatment to the final polymer. Other advantages of this stepwise working technique have already been described above, others will appear evident in the examples below.

Cross-linking of the chain type or linear polyesters can also be achieved by the use of cross-linking agents. Unsaturated compounds of the formula

R′OOC—R—COOR′ wherein R is an aliphatic carbon chain, either saturated alkyl or unsaturated alkyl with one C=C bond, and R′ is an unsaturated alkyl group are useful. Diallyl succinate and diallyl fumarate are examples of such compounds. Other agents which are useful include maleic anhydride, maleic amide, metal salts of unsaturated aliphatic mono- and dicarboxylic acids, e.g. zinc acrylate, and organo-silicon compounds. The introduction of such agents as chain connectors broadens the range of elasticity. The amount of agent should be in the range of about 1 to 15 percent by weight based on the amount of the ester. Addition of catalytic amounts, e.g. about 1 to 10 percent based on the cross-linking agent, of a peroxide such as di-benzoylperoxide or di-cumylperoxide can be useful in some instances.

Organo-silicon compounds can be used in a post-curing process to obtain rubber-like materials from the cross-linked ester-alcohol elastomers. Useful organo-silicon compounds include, for example, dialkyl-dihalosilanes, e.g. dimethyl silicondichloride and diethyl silicon-dichloride, and dialkyl dialkoxysilanes, e.g., dimethyl diethoxysilane. The post-curing can be carried out with or without a solvent. Suitable solvents include aliphatic hydrocarbons and chlorinated aliphatic hydrocarbons.

The invention will be further illustrated by the following examples.

Example 1

(A) An amount of 4.64 grams (⅟₅₀ mole) of dimethyl-2,5-dihydroxy-hexahydro-terephthalate (DDHT), 4.96 grams (⅘₀ mole) of ethylene glycol, and 0.14 gram (3% based on DDHT) of p-toluenesulfonic acid were heated in a nitrogen atmosphere. At about 80° C., methanol started to distill off. The clear liquid mixture was kept at 200–210° C. for one hour and then at 230–235° C. for four more hours. The viscosity of the melt increased considerably at 220° C. after a total heating time of 3.5 hours and reached its optimum at 235° C. after 1.5 more hours. A vacuum of 2.5 mm. Hg was applied for the last 60 minutes to remove excessive glycol.

The obtained cross-linked polymer is slightly yellow colored, has rubber-like compressible and stretchable elasticity combined with good tensile strength and recovery. The polymer is thermostable up to 410° C. in vacuo and does not lose its elastic properties when heated to this temperature.

(B) A polymer of similar properties was obtained when the above described reaction was carried out with diethyl-2,5-dihydroxy-hexahydro-terephthalate instead of the dimethylester.

Example 2

An amount of 4.64 grams (⅟₅₀ mole) dimethyl-2,5-dihydroxy-hexahydro-terephthalate, 4.96 grams (⅘₀ mole) of ethylene glycol, and 0.35 gram (7.5%) of p-toluenesulfonic acid were polymerized as described in Example 1. A final polymerization temperature of 240–245° C. was maintained.

This very hard elastomer is cross-linked. It is slightly yellow colored and transparent. Its elastic recovery is slow but the tensile strength is very high.

Example 3

An amount of 4.64 grams (⅟₅₀ mole) of dimethyl-2,5-dihydroxy-hexahydro-terephthalate, 9.92 grams (⅘₀ mole) of ethylene glycol, and 3.5 grams (7.5%) of p-toluenesulfonic acid was heated for five hours at 150–160° C. under nitrogen. Methanol distilled off at this temperature. The mixture was allowed to cool to about 70° C., vacuum (2 mm. Hg) was applied and heating was continued for eight more hours at 220–230° C. After excessive glycol had evaporated, the viscosity increased at 215° C. and reached its optimum at 225° C.

The polymer has rubber-like elastic properties but is softer than the elastomer of Examples 1 and 2. It is slightly yellowish colored, transparent and shows a good elastic recovery. The tensile strength is considerable and the thermal stability is comparable to the polymer of Example 1.

Example 4

A mixture of 4.64 grams (⅟₅₀ mole) of dimethyl-2,5-dihydroxy-hexahydro-terephthalate, 9.92 grams (⅘₀ mole) of ethylene glycol, and 0.047 gram (1%) of p-toluenesulfonic acid was heated for 2.7 hours at 146–166° C. After cooling to 70° C., vacuum (2.4 mm. Hg) was applied and the mixture was then kept for 1.5 hours at 185–215° C. and for five hours at 220–225° C.

The polymer has both compressible and stretchable elastic properties combined with good tensile strength. It is soft, colorless, transparent and has a moderate recovery speed. The most remarkable property is a great adhesive force to glass.

Example 5

A mixture of 4.64 grams (⅟₅₀ mole) of dimethyl-2,5-dihydroxy-hexahydro-terephthalate, 9.92 grams (⅘₀ mole) of ethylene glycol, and 0.232 gram (5%) of polyphosphoric acid was heated under nitrogen for six hours at 150–163° C. The polycondensation was finished by heating for six hours at 200–228° C. in vacuo (0.8 mm. Hg).

The polymer was cross-linked, very hard but not brittle, almost colorless and transparent. It has no elastic properties, is slightly formable and has a very high shear strength. Its adhesive force to glass is greater than the cohesive force of glass itself.

Example 6

A mixture of 4.64 grams (⅟₅₀ mole) of dimethyl-2,5-dihydroxy-hexahydro-terephthalate, 9.92 grams (⅘₀ mole) of ethylene glycol, and 0.464 gram (10%) of polyphosphoric acid was reacted as described in Example 5 with the exception that the time of transesterification was cut from six hours to 4.7 hours.

The polymer is similar to that of Example 5 but much more flexible. The adhesive force to glass is much improved. This polymer is especially suited for making laminated splinter-proof glass.

Example 7

A mixture of 4.64 grams (0.02 mole) of dimethyl-2,5-dihydroxy-hexahydro-terephthalate, 1.24 grams (0.014 mole) of glycerol, and 0.1 gram (2.1%) of p-toluenesulfonic acid was heated at 165° C. for three hours under nitrogen and for 4.7 more hours at 190–216° C. in vacuo (3 mm. Hg).

The polymer is colorless, opaque, not transparent, has a high shear strength and a bone-like appearance.

*Example 8*

A mixture of 4.64 grams (1/50 mole) of dimethyl-2,5-dihydroxy-hexahydro-terephthalate, 18.4 grams (10/50 mole) of glycerol, and 0.1 gram (2.1%) of p-toluene-sulfonic acid was heated for one hour at 110–150° C. under nitrogen and for 6.5 more hours at 165–190° C. in vacuo.

A soft brown yellow colored polymer with compressible elastic properties and a low tensile strength is obtained.

*Example 9*

A mixture of 4.64 grams (1/50 mole) of dimethyl-2,5-dihydroxy-hexahydro-terephthalate, 14.72 grams (8/50 mole) of glycerol, and 0.1 gram (2.1%) of polyphosphoric acid was heated from 100° to 160° C. within four hours. The polymerization was carried out during five hours at 200–230° C. in vacuo (0.35 mm. Hg).

The polymer is only slightly colored and transparent. Flakes of this polycondensation show a leaf spring-like elasticity.

*Example 10*

A mixture of 4.64 grams (1/50 mole) of dimethyl-2,5-dihydroxy-hexahydro-terephthalate, 9.92 grams (8/50 mole) of ethylene glycol, and 0.1 gram (2.1%) of p-phenylphosphonic acid was heated for 4.3 hours at 120–160° C. under nitrogen and for 6.3 hours at 190–230° C. in vacuo (1.0 mm. Hg), yielding a hard, colorless resin.

*Example 11*

When the polycondensation as described in Example 10 was carried out with p-tolyl-boronic acid instead of p-phenylphosphonic acid, a brownish hard resin was obtained.

*Example 12*

A mixture of 4.64 grams (1/50 mole) of dimethyl-2,5-dihydroxy-hexahydro-terephthalate, 1.86 grams (3/100 mole) of ethylene glycol, and 0.04 gram (0.9%) of magnesium oxide was heated for 2.5 hours at 150–190° C. and 2.5 hours at 200–250° C. in vacuo (1.5 mm. Hg), yielding a yellowish colored, hard resin.

A similar product was obtained when the above described polymerization was catalyzed by 0.4 gram (8.6%) of sodium methylate instead of magnesium oxide.

*Example 13*

Amounts of 4.64 grams (1/50 mole) of dimethyl-2,5-dihydroxy-hexahydro-terephthalate, 9.3 grams (15/100 mole) of ethylene glycol, and 0.5 gram (10.8%) of zinc chloride were heated for 1.5 hours at 160° C. and 2.5 hours at 175–200° C. in vacuo (3 mm. Hg), yielding a colorless, brittle, cross-linked polymer.

*Example 14*

A mixture of 4.64 grams (1/50 mole) of dimethyl-2,5-dihydroxy-hexahydro-terephthalate, 15.2 grams (10/50 mole) of propylene glycol, and 0.5 gram of p-toluenesulfonic acid was polymerized for two hours at 140–180° C. and 3.5 hours at 190–230° C. in vacuo (5 mm. Hg) resulting in a dark polymer with plastic properties.

*Example 15*

A mixture of 4.64 grams (1/50 mole) of dimethyl-2,5-dihydroxy-hexahydro-terephthalate, 15.2 grams (10/50 mole) of 1,3-propanediol, and 0.5 gram of p-toluenesulfonic acid was polymerized for 3.8 hours at 135–170° C. and 6.5 hours at 210° C. in vacuo (5 mm. Hg), resulting in a soft slightly brown polymer with compressible and stretchable elastic properties.

*Example 16*

A mixture of 4.64 grams (1/50 mole) of dimethyl-2,5-dihydroxy-hexahydro-terephthalate, 3.12 grams (3/100 mole) of neopentyl glycol, and 0.04 gram (0.9%) of MgO was heated for two hours at 150–190° C. and for 3.5 hours at 220–250° C. in vacuo (5 mm. Hg).

A slightly yellow colored, glossy, hard polymer was obtained.

*Example 17*

Amounts of 4.64 grams (1/50 mole) of dimethyl-2,5-dihydroxy-hexahydro-terephthalate, 6.24 grams (6/50 mole) of neopentyl glycol, and 0.232 gram (5%) of polyphosphoric acid were heated from 180° C. up to 235° C. in six hours and then kept there for seven more hours, thus yielding a colorless, transparent polymer with adhesive force to glass and considerable shear strength.

*Example 18*

Amounts of 4.64 grams (1/50 mole) of dimethyl-2,5-dihydroxy-hexahydro-terephthalate, 6.24 grams (6/50 mole) of neopentyl glycol, and 0.232 gram (5%) of p-toluenesulfonic acid yielded under the experimental conditions of Example 17 a yellow colored, transparent and very hard polymer of good shear strength. The product is not brittle and has an adhesive force to glass and metals.

*Example 19*

A mixture of 4.64 grams (1/50 mole) of dimethyl-2,5-dihydroxy-hexahydro-terephthalate, 8.16 grams (6/50 mole) of pentaerythritol, and 0.232 gram (5%) of polyphosphoric acid was heated up to 215° C. within one hour and the temperature kept then at 225° C. for four hours. Finally, the temperature was raised to 250° C. for 1.5 hours and a vacuum was applied.

The obtained polymer is slightly yellow colored, clear transparent, very hard and has a high shear strength.

*Example 20*

Amounts of 4.64 grams (1/50 mole) of dimethyl-2,5-dihydroxy-hexahydro-terephthalate, 4.96 grams (4/50 mole) of ethylene glycol, and 0.14 gram (3%) of sulfamic acid were heated for two hours at 190–210° C. and for 2.5 hours at 230–250° C. under nitrogen. Vacuum was applied during the last hour of reaction only.

The resulting polymer is a hard reddish brown resin, softening at about 200° C.

*Example 21*

A mixture of 4.64 grams (1/50 mole) of dimethyl-2,5-dihydroxy-hexahydro-terephthalate, 4.96 grams (4/50 mole) of ethylene glycol, and 0.14 gram (3%) of methane-sulfonic acid was heated up to 180° C. within 2.5 hours and then kept at 225° C. for three hours under nitrogen.

The obtained polymer is almost colorless, both stretchable and compressible elastic, has a good tensile strength and an average recovery speed.

*Example 22*

An amount of 4.64 grams (1/50 mole) of dimethyl-2,5-dihydroxy-hexahydro-terephthalate, 11.04 grams (6/50 mole) of glycerol, and 0.1 gram (2.1%) of potassium bisulfate, heated to 180° C. in two hours and kept at 225° C. for 2.5 hours under nitrogen, formed an almost colorless solid polymer with good shear strength.

*Example 23*

Amounts of 4.64 grams (1/50 mole) of dimethyl-2,5-dihydroxy-hexahydro-terephthalate, 6.24 grams (6/50 mole) of neopentyl glycol, and 0.32 gram (5%) of trichloroacetic acid were heated for five hours at 190–220° C. under nitrogen and for six hours at 225–250° C. in vacuo (1.8 mm. Hg), yielding a hard polymer of good mechanical properties.

Example 24

Amounts of 4.64 grams (1/50 mole) of dimethyl-2,5-dihydroxy-hexahydro-terephthalate, 14.9 grams of triethanolamine and 0.5 gram of p-toluenesulfonic acid were heated at 150–175° C. for three hours under nitrogen and for six hours at 190–210° C. in vacuo (0.5 mm. Hg).

The formed polymer is a brown colored elastomer with good compressibility.

Example 25

A mixture of 4.64 grams (1/50 mole) of dimethyl-2,5-dihydroxy-hexahydro-terephthalate, 5.4 grams (2/50 mole) of 1,2,5-hexanetriol, and 0.05 gram of p-toluenesulfonic acid was heated up to 185° C. within five hours and then kept at this temperature for eight more hours. Excessive hexanetriol was removed by applying vacuum for three hours at 185° C. Then, the polymerization was completed at 165° C. under nitrogen during the next eight hours.

The obtained polymer has good elastic and strong adhesive properties. The colors of different runs vary between slightly yellow and amber.

Example 26

Amounts of 4.64 grams (1/50 mole) of dimethyl-2,5-dihydroxy-hexahydro-terephthalate, 10.5 grams of diethanolamine, and 0.5 gram of p-toluene sulfonic acid were heated at 150–160° C. for six hours under nitrogen and three hours at 190–195° C. in vacuo (0.5 mm. Hg). The formed polymer, having a brownish color, has good compressible elasticity, but is only slightly stretchable.

Example 27

A linear polyester was prepared by polymerization of 4.64 grams (1/50 mole) of dimethyl-2,5-dihydroxy-hexahydro-terephthalate, 4.92 grams (4/50 mole) of glycol, and 0.05 gram of p-toluene sulfonic acid at 170° C. under nitrogen for 48 hours. During the last two hours vacuum was applied to remove excessive ethylene glycol. The remaining soft elastomer was then mixed with 0.4 gram of diallyl succinate and 0.02 gram of dibenzoylperoxide. The mixture was heated under nitrogen up to 250° C. and kept at this temperature for four hours. The obtained cross-linked polyester is a very stretchable elastomer with a moderate rate of elastic recovery.

Example 28

A linear polyester, prepared in the same manner as above, was heated with 0.05 gram of maleic anhydride at 200–205° C. for 12 hours.

The obtained resin is very stiff, slightly plastic and has a very high tensile strength.

A polymer with very similar properties was obtained by reacting 5.4 grams of the linear polyester with 0.06 gram of zinc acrylate.

Example 29

An amount of 5.0 grams of a linear polyester, prepared from DDHT and ethylene glycol according to the procedure given in the foregoing examples, was dissolved in 50 milliliters of methylene chloride and a solution of 2.8 grams of $(C_2H_5)_2SiCl_2$ in 25 milliliters of $CH_2Cl_2$ was added. The mixture was refluxed for five hours. After removal of the solvent, the remaining highly viscous material was heated for four hours at 120–140° C. and for 12 hours at 220–240° C. The obtained yellow colored elastomer has soft rubbery properties, high tensile strength, is very stretchable and has a high rate of elastic recovery.

Example 30

An amount of 5.0 grams of cross-linked polyester from DDHT and glycol (preparation according to the above examples) was heated in a solution of 0.6 gram of $(CH_3)_2SiCl_2$ in 50 milliliters of Skellysolve C for eight hours. The solvent was removed in vacuo and the remaining polymer pieces of defined shapes heated at 170–200° C. for five hours in vacuo.

The obtained elastomer is a hard rubber with a very high tensile strength and both excellent elastic recovery and rate of elastic recovery.

Example 31

Amounts of 7.1 grams of a linear polyester—prepared from DDHT and ethylene glycol according to foregoing examples—and 1.8 grams of dimethyl-diethoxysilane were dissolved in 50 milliliters of methylene chloride. The solvent was distilled off and the remaining material successively heated up to 160° C. within the next two hours. Then, 0.07 gram of p-toluene sulfonic acid was added and the temperature raised to 225° C. The polymerization was completed at this temperature during 16 hours.

The obtained polymer is a soft rubber-like elastomer with high tensile strength and very good elastic recovery.

The polymers of this invention can contain, of course, various conventional additives such as dyes, pigments, lubricants, plasticizers and modifying agents.

What is claimed is:

1. Polymerization products comprising the polymeric polycondensation products of not less than 1 mole of a polyhydric aliphatic alcohol containing from 2 to 6 hydroxy groups with 1 mole of a lower alkyl ester of 2,5-dihydroxy-hexahydro-terephthalic acid wherein the alkyl group contains from 1 to 8 carbon atoms.

2. The products of claim 1 in which the alcohol is a glycol.

3. A polymerization product comprising the polymeric polycondensation product of 1 mole of dimethyl-2,5-dihydroxy-hexahydro-terephthalate with not less than 1 mole of ethylene glycol.

4. A polymerization product comprising the polymeric polycondensation product of 1 mole of dimethyl-2,5-dihydroxy-hexahydro-terephthalate with not less than 1 mole of propylene glycol.

5. A polymerization product comprising the polymeric polycondensation product of 1 mole of dimethyl-2,5-dihydroxy-hexahydro-terephthalate with not less than 1 mole of propanediol-1,3.

6. A polymerization product comprising the polymeric polycondensation product 1 mole of dimethyl-2,5-dihydroxy-hexahydro-terephthalate with not less than 1 mole of neopentyl glycol.

7. The products of claim 1 in which the alcohol is a trihydric alcohol.

8. A polymerization product comprising the polymeric polycondensation product of 1 mole of dimethyl-2,5-dihydroxy-hexahydro-terephthalate with not less than 1 mole of glycerol.

9. The products of claim 1 in which the alcohol is a tetrahydric alcohol.

10. The products of claim 1 in which the carbon chain in the alcohol is interrupted by one of the atoms oxygen, sulfur and nitrogen.

11. Polymerization products comprising the linear polymeric polycondensation products of not less than 1 mole of a polyhydric aliphatic alcohol containing from 2 to 6 hydroxy groups with 1 mole of a lower alkyl ester of 2,5-dihydroxy-hexahydro-terephthalic acid, wherein the alkyl group contains from 1 to 8 carbon atoms, cross-linked by means of a cross-linking agent selected from the group consisting of diallyl succinate, maleic anhydride, zinc acrylate, diethyl silicondichloride, and dimethyl diethoxysilane present in quantities of from about 1 to 15 percent by weight based on said ester.

12. A polymerization product comprising the linear polymeric polycondensation product of 1 mole of dimethyl-2,5-dihydroxy-hexahydro-terephthalate with not less than 1 mole of ethylene glycol cross-linked by means of from about 1 to about 15 percent by weight of maleic anhydride based on the dimethyl-2,5-dihydroxy-hexahydro-terephthalate.

13. Polymerization products comprising the crosslinked polymeric polycondensation products of not less than 1 mole of a polyhydric aliphatic alcohol containing from 2 to 6 hydroxy groups with 1 mole of alkyl ester of 2,5-dihydroxy-hexahydro-terephthalic acid, wherein the alkyl group contains from 1 to 8 carbon atoms, post-cured by heating with a dialkyl dihalosilane.

14. A polymerization product comprising the crosslinked polymeric polycondensation product of 1 mole of dimethyl-2,5-dihydroxy-hexahydro-terephthalate with not less than 1 mole of ethylene glycol post-cured by heating with dimethyl silicondichloride.

15. The method of preparing polymerization products which comprises reacting not less than 1 mole of a polyhydric aliphatic alcohol containing from 2 to 6 hydroxy groups with 1 mole of a lower alkyl ester of 2,5-dihydroxy-hexahydro-terephthalic acid wherein the alkyl group contains from 1 to 8 carbon atoms, at a temperature effective to produce the polymeric products.

16. The method of claim 15 in which the temperature is between about 60° C. and about 250° C.

17. The method of claim 16 in which the reaction is carried out in the presence of a transesterification catalyst.

18. The method of claim 17 in which the alcohol is ethylene glycol and the ester is dimethyl-2,5-dihydroxy-hexahydro-terephthalate.

References Cited in the file of this patent

UNITED STATES PATENTS

| | | |
|---|---|---|
| 2,721,854 | Kohl | Oct. 25, 1955 |
| 2,806,057 | Finch et al. | Sept. 10, 1957 |
| 2,887,468 | Caldwell et al. | May 19, 1959 |